(12) United States Patent
Ng et al.

(10) Patent No.: US 7,744,031 B2
(45) Date of Patent: Jun. 29, 2010

(54) APPARATUS AND METHOD TO REDUCE/ELIMINATE LOCKUP OF SEATBELT RETRACTOR DURING MOTORIZED PRETENSIONING ACTIVATION

(76) Inventors: Kevin Wei-Loong Ng, 1847 Flagstone Cir., Rochester, MI (US) 48307; Michael T. Moury, 14570 Patterson Dr., Shelby Township, MI (US) 48315

( * ) Notice: Subject to any disclaimer, the term of this patent is extended or adjusted under 35 U.S.C. 154(b) by 717 days.

(21) Appl. No.: 11/548,680

(22) Filed: Oct. 11, 2006

(65) Prior Publication Data

US 2007/0090224 A1  Apr. 26, 2007

Related U.S. Application Data

(60) Provisional application No. 60/729,441, filed on Oct. 21, 2005.

(51) Int. Cl.
*B65H 75/48* (2006.01)
(52) U.S. Cl. ............... 242/390.8; 242/396.2; 242/396.5
(58) Field of Classification Search ............. 242/390.8, 242/390.9, 396.2, 396.5; 297/475, 476
See application file for complete search history.

(56) References Cited

U.S. PATENT DOCUMENTS

| | | | |
|---|---|---|---|
| 6,443,382 B1 | 9/2002 | Bae | |
| 6,626,388 B2 * | 9/2003 | Nagata et al. | 242/374 |
| 7,290,730 B2 * | 11/2007 | Nagata et al. | 242/374 |
| 2003/0122020 A1 * | 7/2003 | Tanji | 242/374 |
| 2005/0061904 A1 * | 3/2005 | Inuzuka et al. | 242/379.1 |
| 2005/0098672 A1 * | 5/2005 | Tanaka et al. | 242/390.8 |
| 2005/0247810 A1 * | 11/2005 | Jabusch | 242/374 |
| 2006/0261589 A1 * | 11/2006 | Tanaka | 280/806 |

* cited by examiner

*Primary Examiner*—Sang Kim
(74) *Attorney, Agent, or Firm*—Brinks Hofer Gilson & Lione

(57) ABSTRACT

A motorized seat belt retractor, comprising: a take-up spool configured to rotate in a winding direction and an unwinding direction; a motor for providing a driving force in a first direction and a second direction to the take-up spool, wherein the take-up spool rotates in the winding direction when the driving force is provided in the first direction; a mechanism coupled to a shaft of the motor, the mechanism being configured to rotate freely in the first direction and rotate in the second direction when either i) a predetermined force is applied to the take-up spool in the unwinding direction during or after application of the driving force in the first direction or ii) the motor applies the driving force in the second direction in order to overcome a predetermined resistance of the mechanism; and a locking retractor configured to prevent the take-up spool from rotating in the unwinding direction when the predetermined force is applied to the take-up spool in the unwinding direction during or after application of the driving force in the first direction.

9 Claims, 7 Drawing Sheets

APPARATUS AND METHOD TO REDUCE/ELIMINATE LOCKUP OF SEATBELT RETRACTOR DURING MOTORIZED PRETENSIONING ACTIVATION

CROSS REFERENCE TO RELATED APPLICATIONS

This application claims the benefit of U.S. Provisional Patent Application Ser. No. 60/729,441, filed Oct. 21, 2005 the contents of which are incorporated herein by reference thereto.

TECHNICAL FIELD

This present invention relates generally to an apparatus and method for taking up slack in a vehicle seat belt.

BACKGROUND

Vehicles are provided with a seat belt and a seat belt retractor. Once the seat belt has been extended or unwound and a tongue is engaged into a latching or buckle device, it is desirable to retract or wind up the excess amount of the seat belt.

Vehicle seat belts are also provided with an automatic winding device that, upon sensing of a predetermined condition will wind up a predetermined amount of slack or amount of seat belt webbing during a predetermined activation event (e.g., a massive deceleration or vehicle conditions sensed before an accident). This device employs a motor, which is energized to wind up the seat belt. In addition, seat belt retractors are also equipped with an automatic locking retractor (ALR) or an emergency locking retractor (ELR) or a combination (switchable) ELR/ALR retractor 12, which will lock the seat belt retractor up (e.g., prevent further pay out of the seat belt webbing) when there is an abrupt pulling (tension) on the belt sensed by a web sensor or there is activation of a G sensor, which in combination of G sensor activation and web payout will cause lockup of the seat belt retractor. In either occurrence, there will be a lockup of the seat belt retractor. In order to unlock ELR/ALR retractor the tension upon the seat belt must be removed, and in the case of activation by a G sensor, the sensed condition must no longer exist.

During operation, a pretension signal will be sent to a motor of the motorized retractor to retract a portion of the seat belt when an imminent danger or predetermined condition is detected. In addition, this predetermined condition is also likely to activate either the G sensor or the web sensor. Upon receipt of the pretension signal, the motorized seatbelt retractor will respond by quickly tensioning the belt to a predetermined level and thereafter a pyrotechnic pre-tensioner and inflatable cushion deployments will follow if an event (e.g., collision) occurs. Some of the features of a motorized seatbelt retractor are: it removes seat belt slack when an imminent danger is detected; and the motorized seatbelt retractor will pull and hold an occupant in a designated position prior to the collision occurring. In addition, the motorized seatbelt retractor is configured to work in harmony with a pyrotechnic pre-tensioning device in order to maximize the distance between the belted occupant and other parts of the vehicle.

If the imminent danger is avoided and no longer present (e.g., collision avoided), the motorized seatbelt retractor is configured to reset itself and remain on a standby mode for the next pre-tensioning signal. However and during this same sequence of events, the ELR/ALR retractor may have locked up due to a quick seat belt web payout or web payout when a G sensor is activated. In addition, a clutch of a gear train of the motorized seatbelt retractor will also become engaged at the beginning of the pretensioning cycle. Moreover, the lock up of the ELR/ALR retractor and the clutch of the motorized seatbelt retractor will keep the tension on the seatbelt and the occupant. As discussed above, this lockup can be initiated by: activation of the web sensor when the seatbelt is subjected to a quick web payout or activation of a G sensor during a G event (above approximately 0.5 G) and where there is relative movement between the web spool and lockup wheel, which is caused by seat belt web payout during the activation of the G sensor. Accordingly, the lockup occurs when the predetermined conditions are sensed and there is seat belt webbing payout. Thus, there is need to provide a means to unlock the belt if the predetermined event is no longer occurring or passes.

One method employed to provide an unlock feature for motorized seatbelt retractors is to provide the motorized retractor with a quick but relatively high burst of current at the end of the pretensioning cycle wherein there has been a lockup of the ELR/ALR retractor. This burst of current will cause the web to pay-in further due to the movement of the gear trans by the motor, which in turn causes a relative-movement between the web spool and lockup wheel. This relative movement will in turn reset the lockup sensors, which in turn unlocks the retractor, and thus returns the webbing to a comfortable tension. However, this method of unlocking of the lockup sensors may not be favorable in that it requires additional tension to be applied to the seat belt that is already in a tensioned state. In other words, and in order to unlock the device, the seat belt webbing has to be pulled in further when it is already in a tensioned state. This additional tension is often referred to a "Second Stroke" phenomenon. In addition, the clutch of the motorized gear train may also need to be unlocked after this sequence via reversal of the motor (e.g., driving the motor in an opposite direction).

Accordingly, it is desirable to provide an apparatus and method for unlocking the motorized retractor after the same has been locked in accordance with a predetermined event (e.g., imminent danger, high G forces, high tension e.g., web payout) and the condition or sensed event passes without the activation of a second system (e.g. inflatable cushion, pyrotechnically activated pretensioning device). Moreover, it is also desirable to provide such an apparatus that has a retractor that locks up only when predetermined tensions or forces are applied during or after motorized retraction.

SUMMARY OF THE INVENTION

The present invention relates to a motorized seatbelt retractor. The primary use of a motorized seatbelt retractor is to pretension a seatbelt system by removing slack in the webbing.

Exemplary embodiments of the present invention relate to a motorized seat belt retractor. The motorized seat belt retractor, comprising: a take-up spool configured to rotate in a winding direction and an unwinding direction; a motor for providing a driving force in a first direction and a second direction to the take-up spool, wherein the take-up spool rotates in the winding direction when the driving force is provided in the first directional a mechanism coupled to a shaft of the motor, the mechanism being configured to rotate freely in the first direction and rotate in the second direction when either i) a predetermined force is applied to the take-up spool in the unwinding direction during or after application of the driving force in the first direction or ii) the motor applies the driving force in the second direction in order to overcome a predetermined resistance of the mechanism; and a locking retractor configured to prevent the take-up spool from rotating in the unwinding direction when the predetermined force is applied to the take-up spool in the unwinding direction during or after application of the driving force in the first direction.

Another exemplary embodiment is directed to a mechanism for preventing a seatbelt webbing from paying out during or after a motorized retraction of the seatbelt webbing by a motorized seat belt retractor. The mechanism comprising: a one-way bearing disposed about a shaft of a motor of the motorized seat belt retractor, the shaft further comprising a gear configured to provide the motorized retraction to the seatbelt webbing, wherein the one-way bearing is configured to freely rotate in a direction corresponding to the motorized retraction of the seatbelt webbing; and a spring disposed about the one-way bearing, the spring providing a frictional resistance to an outer diameter of the one-way bearing and the frictional resistance is overcome when either i) a predetermined force is applied to the seatbelt webbing during or after the motorized retraction of the seatbelt webbing, which overcomes the frictional resistance or ii) the motor applies a driving force in a direction opposite to the direction corresponding to the motorized retraction of the seatbelt webbing in order to overcome the frictional resistance.

In an exemplary embodiment, a method for limiting lockup of a seatbelt retractor during predetermined conditions is provided. The method comprising: providing the seatbelt retractor with a motor in order to provide a motorized retraction of a portion of a seatbelt webbing coupled to the seatbelt retractor in a first direction; providing the seatbelt retractor with a locking retractor configured to prevent payout of the seatbelt webbing in a second direction under predetermined conditions, wherein an initial payout of the seatbelt webbing in the second direction is required to activate the locking retractor; preventing payout of the seatbelt webbing in the second direction during or after motorized retraction of a portion of the seatbelt webbing by a mechanism coupled to the motor, the mechanism being configured to prevent payout of the seatbelt webbing in the second direction during or after motorized retraction of a portion of the seatbelt webbing in the first direction, wherein the mechanism is configured to allow payout of the seatbelt webbing in the second direction when a predetermined force is applied to the seat belt webbing.

DETAILED DESCRIPTION OF THE EXEMPLARY EMBODIMENTS

The disclosure of the present invention relates to a motorized seatbelt retractor that will mitigate (or eliminate) the second stroke phenomenon of prior motorized seatbelt retractors. More particularly, exemplary embodiments of the present invention will prevent ALR/ELR lockup or locking retractor lockup during or after a motorized retraction as tensions or forces applied to the seatbelt that are less then a predetermined value will be prevented from causing seatbelt payout, which in turn is required to lock up the ALR/ELR device or locking retractor.

As discussed herein, the lockup of the motorized seatbelt retractor may occur when a lockup sensor or sensors of the locking retractor are excited, and there is a payout of the seatbelt web or there is a payout of the seatbelt at a high rate. In addition, it is also noted that motorized retraction of the seatbelt webbing typically occurs when vehicle sensors have detected predetermined conditions that will also result in the excitation of the sensors of the ALR/ELR devices therefore, payout of the seatbelt webbing during this condition (e.g., motorized retraction of the seatbelt webbing or thereafter) most likely will result in a locking up of the seatbelt retractor via the ALR/ELR device. If the vehicle conditions which activated the sensor of the retractor device are no longer occurring and unlocking of the retractor device is desired, the motorized retractor must wind the webbing in to unlock the retractor.

In accordance with an exemplary embodiment of the present invention, an apparatus and method for preventing web pay out during a motorized seatbelt pretensioning cycle is provided, wherein lockup of the ELR/ALR retractor under certain conditions is prevented thus, no second stroke of the seat belt webbing is required. In addition, and if the ELR/ALR retractor does become engaged or locked, the apparatus provides a means for mitigating the amount of seat belt pay in, in order to unlock the ELR/ALR retractor thus, reducing the perceived severity of the required second stroke. Moreover, the apparatus or mechanism is also configured to allow unlocking of a clutch mechanism that couples the motor to the take-up spool.

Figure 1:
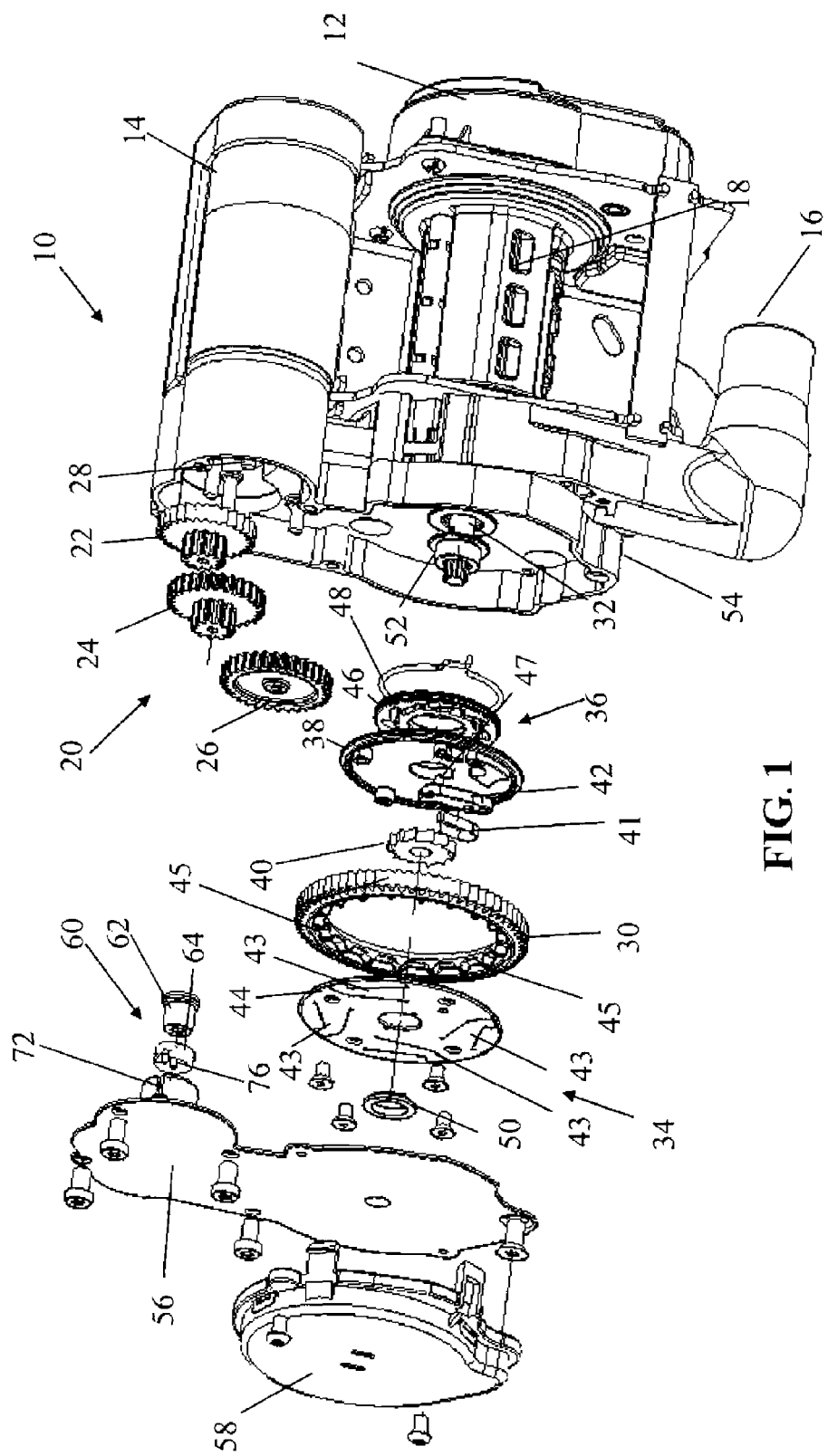
FIG. 1 is an exploded view of a motorized seatbelt retractor constructed in accordance with an exemplary embodiment of the present invention.
Figure 2:
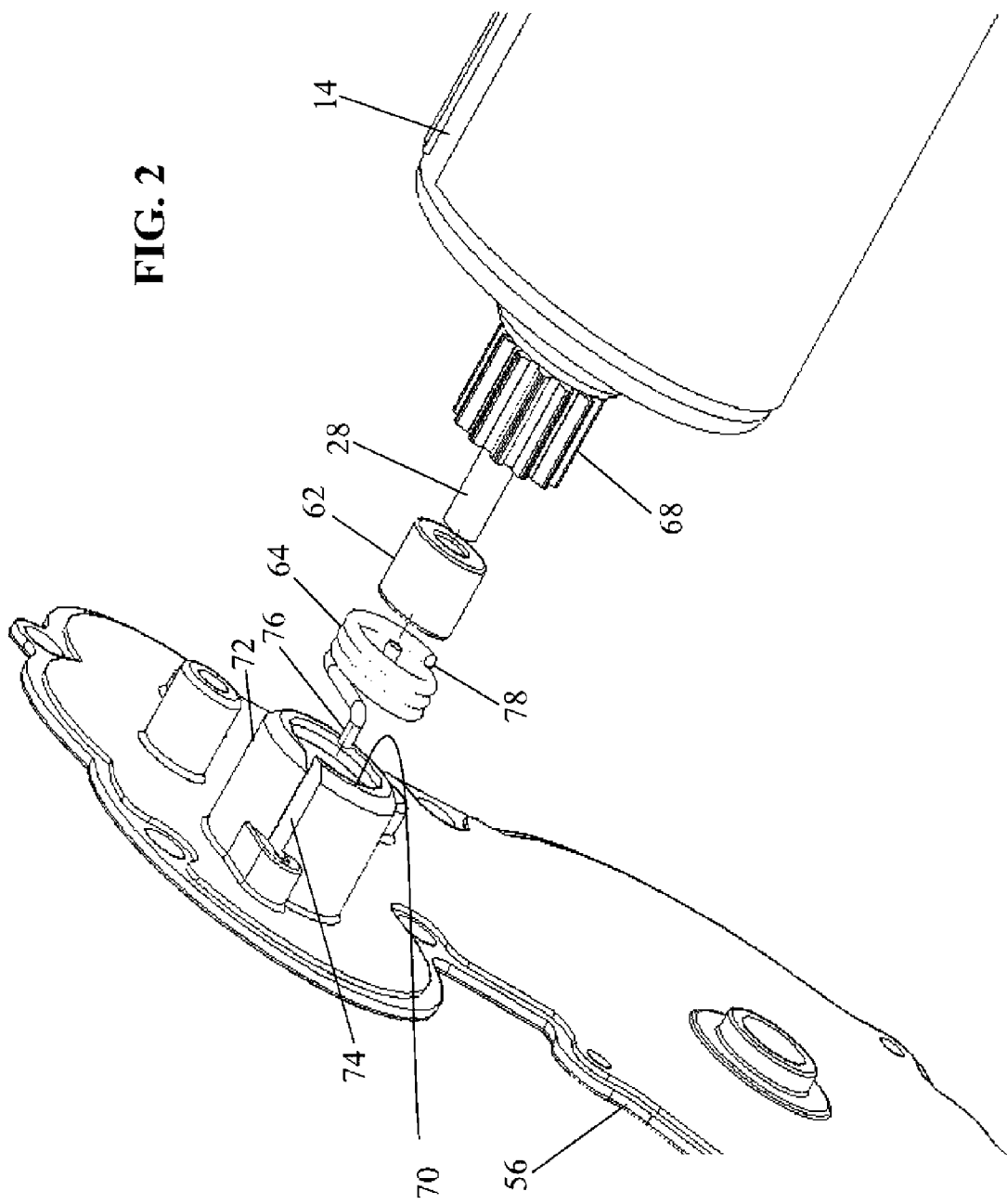
FIG. 2 is an exploded view of an anti-second stroke/anti-seat belt payout mechanism constructed in accordance with an exemplary embodiment of the present invention.
Figure 4:
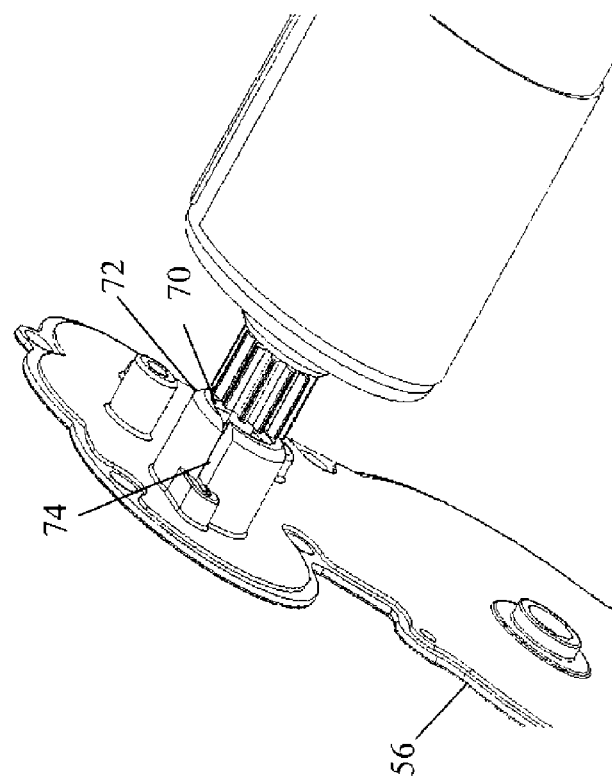
FIG. 4 is a partial perspective view of a motorized seatbelt retractor constructed in accordance with an exemplary embodiment of the present invention.
Figure 3:
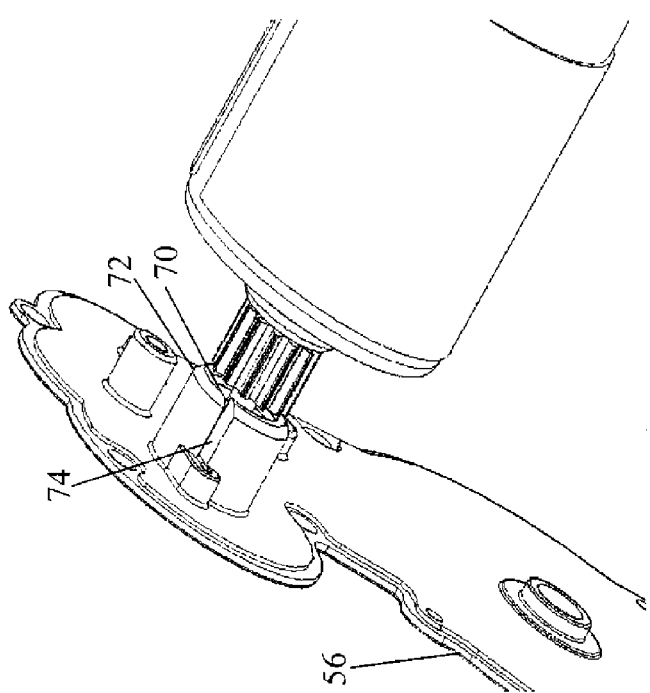
FIG. 3 is a partial perspective view of an anti-second stroke/anti-seat belt payout mechanism constructed in accordance with an exemplary embodiment of the present invention.
Figure 5:
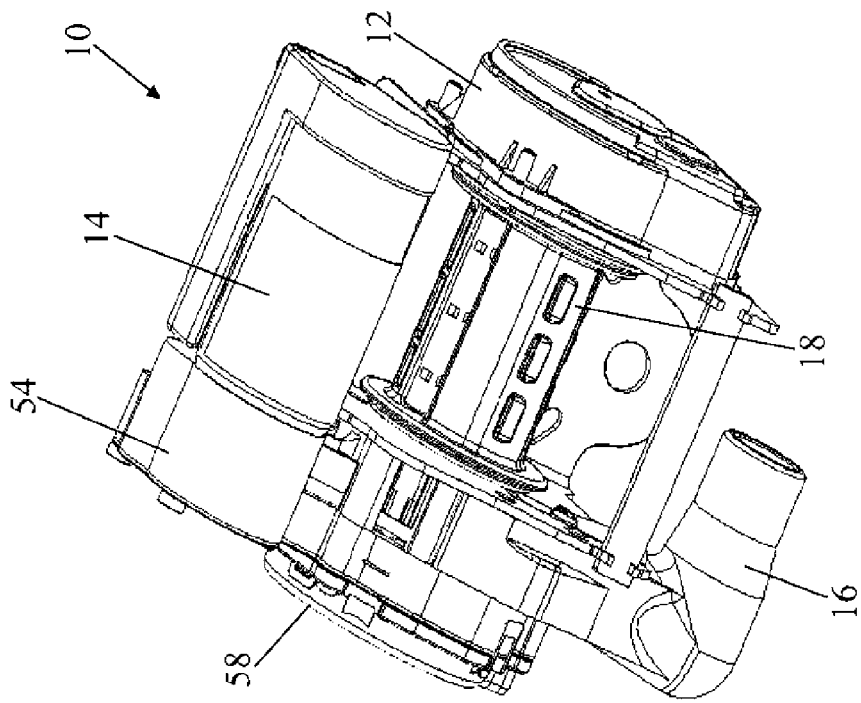
FIG. 5 is a perspective view of a motorized seatbelt retractor constructed in accordance with an exemplary embodiment of the present invention.
Figure 6:
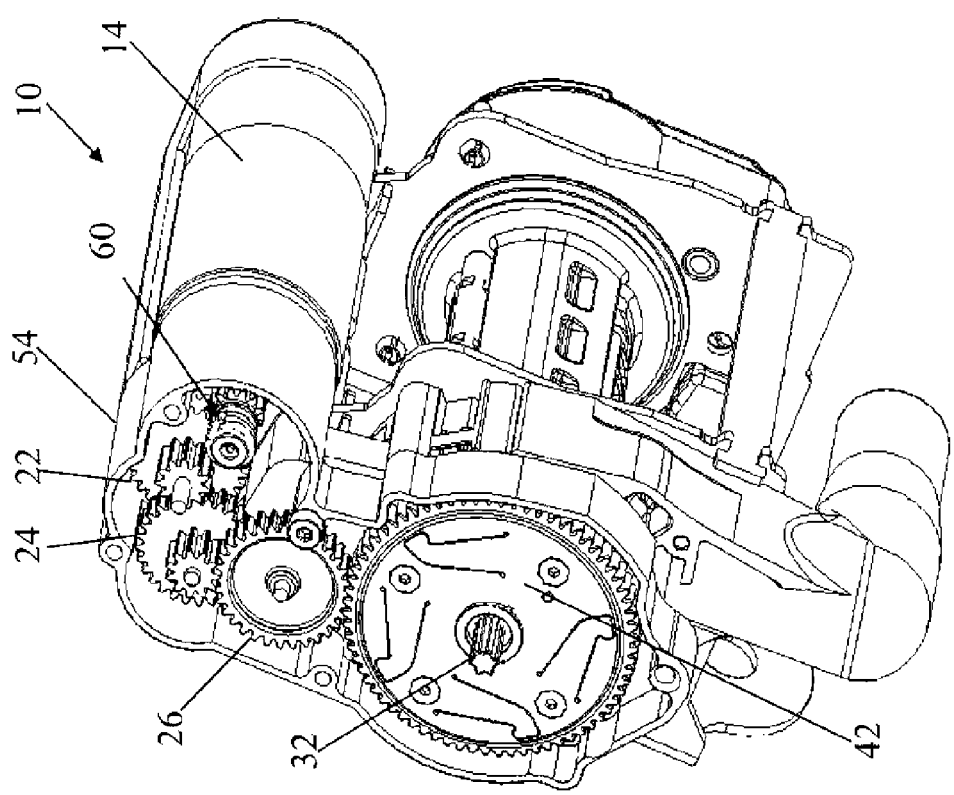
FIG. 6 is also a perspective view of a motorized seatbelt retractor constructed in accordance with an exemplary embodiment of the present invention.

Referring now to FIG. 1, an exploded view of a motorized seatbelt retractor 10 constructed in accordance with an exemplary embodiment of the present invention is illustrated. Motorized seatbelt retractor 10 comprises an automatic locking retractor (ALR) 12, a safety belt retractor that locks and maintains a fixed seat belt length during use or an emergency locking retractor (ELR) 12 the allows the belt to move freely and locks only when the vehicle or occupant slows quickly/abruptly or stops suddenly or a combination (switchable) ELR/ALR retractor 12, a safety belt retractor that can be operated in the emergency locking mode for adults and switched to the automatic locking mode for use with a child safety seat, a motor 14, a pyrotechnic pre-tensioning device 16 each of which is intermittingly coupled to and/or provides a rotational force to a take-up spool 18 of the motorized seatbelt retractor. Take-up spool 18 provides a surface for winding up a portion of a seat belt webbing (not shown). As used herein "locking retractor" refers to anyone of the aforementioned devices (e.g. ALR, ELR and ALR/ELR) and is designated by reference numeral 12. A non-limiting example of an ELR device is found in U.S. Pat. No. 6,443,382, the contents of which are incorporated herein by reference thereto.

A gear train 20 comprising a first step gear 22 and a second step gear 24 is positioned to provide a rotational force to an idler gear 26 from a shaft 28 of motor 14. When rotated idler gear 26 is configured to provide a rotational force to another gear 30 coupled to a shaft or torsion bar 32 of take-up spool 18 via an overload mechanism 34 and a clutch mechanism 36. Although, a gear train 20 is illustrated in the attached Figures, it is understood that the motor may be coupled to the take-up spool via any equivalent device. Non-limiting examples include belts, chains and other gear arrangements.

In one non-limiting exemplary embodiment, overload mechanism 34 and clutch mechanism 36 comprise an overload rear plate 38, a ratchet 40, a lock pawl 43, an overload front plate 44, a control plate 46 and a control plate spring 48. Clutch mechanism 36 provides a means for transferring a rotational force from the motor shaft to the take-up spool. In accordance with an exemplary embodiment and when the motor provides a rotational force to the gear train, gear 30 is rotated and the clutch mechanism couples gear 30 to the take-up spool. This coupling is facilitated through the pivotal movement of lock pawl 42 on rear plate 38. Lock pawl 42 is configured to engage ratchet 40 as a pin 47 of the lock pawl engages features of the control plate 46 thus causing pivotal movement of the lock pawl. Pin 47 passes through a slot or opening in rear plate 38. In accordance with an exemplary embodiment lock pawl 42 is biased into a non-engagement position by a spring member 41. In essence, rotational movement of the motor in the first direction will cause the clutch mechanism to couple the motor to the take-up spool.

In accordance with an exemplary embodiment overload mechanism 34 comprises front plate 44. Front plate 44 has a plurality of spring members 43, which are configured to engage features 45 disposed on an inner periphery of gear 30. In accordance with an exemplary embodiment and when the clutch mechanism is engaged and a force is applied to the take-up spool, which is greater than a predetermined force overload mechanism allows the take-up spool to rotate without damaging the clutch mechanism. In accordance with an exemplary embodiment, this predetermined force is greater than another predetermined force wherein the anti-second stroke mechanism of an exemplary embodiment of the present invention is configured to allow for rotational movement of the take-up spool.

In addition, a first bearing 50 and a second bearing 52 are also disposed on shaft or torsion bar 32 of take-up spool 18.

During motorized retraction of the seatbelt (e.g., driving of the gear train by rotation of the motor shaft in a counterclockwise direction) the lock pawl 42 will engage and the retractor (e.g., take-up spool) will retract a predetermined amount of seatbelt webbing.

As illustrated in FIG. 1, all of these components are received within a cavity or receiving area defined by a housing 54, which is secured to motorized seatbelt retractor 10, wherein a housing cover 56 is secured thereto in order to enclose all of the components within the area defined by housing 54. In addition, a webbing retract spring pack 58 is also secured to an exterior surface of housing cover 56.

In accordance with an exemplary embodiment, an anti-secured stroke/anti-seat belt payout mechanism 60 is secured to shaft 28 of motor 14. Although the anti-seat belt payout mechanism is shown coupled to shaft 28 it is also contemplated that the anti-seat belt payout mechanism can be positioned anywhere along the gear train of the motorized retractor as long as the desired resistances are provided after motorized seat belt retraction, non-limiting examples include the shafts of the step gears, idler gears, take-up spool, overload mechanism and clutch mechanism, etc. Accordingly, mechanism 60 may be coupled to the motor via any suitable portion of the gear train including but not limited to the shaft 28 of the motor. As will be discussed herein, anti-second stroke/anti-seat belt payout mechanism 60 prevents the retractor from locking up in certain condition (e.g., during or after motorized retraction and retractor sensor activation and when the force of the seat belt webbing is insufficient to overcome the resistance of the anti-second stroke/anti-seat belt payout mechanism 60), while providing or allowing for retractor lockup during predetermined conditions (e.g., during or after motorized retraction and retractor sensor activation and when the force of the seat belt webbing is sufficient to overcome the resistance of the anti-second/anti-seat belt payout mechanism 60). In accordance with an exemplary embodiment, the anti-second stroke/anti-seat belt payout mechanism prevents lock up of the retractor under certain conditions as the lock up of the retractor requires a minimal amount of pay out of the seat belt webbing in order to lock the retractor up.

In addition, the anti-seat belt payout mechanism will also limit the amount of required "second stroke" in order to unlock the retractor. In addition and since the clutch of the gear train is locked after motorized retraction, anti-seat belt payout mechanism 60 will, as will be discussed herein, resist further payout under certain conditions (e.g., forces below the frictional resistance of the anti-second stroke/anti-seat belt payout mechanism). Thereafter and if the resistance is overcome, the seat belt webbing will pay out and then the retractor will lock up.

In accordance with an exemplary embodiment and if a force is applied to the seatbelt webbing which is greater than the frictional resistance of the anti-second stroke/anti-seat belt payout mechanism or the overload mechanism 34 is overcome, the take-up spool will rotate as a torsion bar of the retractor twists under this load.

If on the other hand, the clutch of the gear train is not locked the take up spool will rotate normally without requiring rotation of the gear train thus, anti-seat belt payout mechanism 60 applies its resistive forces only after motorized retraction wherein the clutch of the gear train is engaged.

In other words, activation of the clutch mechanism is required to couple the take-up spool to the motor and this occurs after or during motorized retraction of the seatbelt webbing. Once the clutch has coupled the take-up spool to the motor the anti-second stroke/anti-seat belt payout mechanism 60 prevents payout of the seatbelt webbing up until the resistance of the mechanism 60 is overcome thus, and since the locking retractor requires seatbelt webbing payout lock up of the locking retractor is prevented by mechanism 60 unless the resistance of the mechanism is overcome.

Another non-limiting example of a clutch mechanism for coupling a motor to a take-up spool is found in U.S. Provisional Patent Application Ser. No. 60/838,901 filed Aug. 18, 2006 the contents of which are incorporated herein by reference thereto.

Referring now to FIGS. 1-6, and in accordance with an exemplary embodiment, the anti-second stroke/anti-seat belt payout mechanism of the seat belt retractor will comprise a one-way bearing 62 and a torsional spring 64. In accordance with an exemplary embodiment, the inner diameter (ID) of the torsional spring is configured to wrap around the outer diameter (OD) of the one-way bearing, in order to provide a means of frictional engagement or resistance between the two. In accordance with an alternative exemplary embodiment, torsional spring 64 is replaced by a cantilevered spring member configured to engage the exterior surface of the one-way bearing (see FIG. 9B). In this embodiment, the spring is fixed to the housing 72 at one end and provides the frictional resistance at the other end. In addition and in another embodiment, the cantilevered spring may be secured in the slotted opening in the housing 72. In addition, any means disposable within the cavity of the housing and being able to provide a friction force to the exterior of the one-way bearing is considered to be within the scope of the present invention. One non-limiting example would be providing a frictional surface with a plurality of features configured to provide a greater amount of frictional resistance in one direction versus another wherein the outer diameter of the one-way bearing will act against the plurality of the features (e.g., a non-limiting example of the plurality of features could be a plurality of teeth configured to have an angular configuration with respect to the surface of the outer diameter of the one-way bearing).

In another alternative exemplary embodiment, the anti-second stroke/anti-seat belt payout mechanism 60 is configured to provide the frictional resistance directly to the shaft of the motor. Thus, the one-way bearing is removed and its functions are replaced by mechanism 60. In accordance with one non-limiting exemplary embodiment mechanism 60 is a spring wrap clutch configured to rotate freely in a first direction (belt winding) and rotate in a second direction when either i) a predetermined force is applied to the take-up spool in a unwinding direction causing rotation of the motor shaft in the second direction of ii) the motor applies a driving force in the second direction in order to overcome a predetermined resistance of the mechanism.

In addition, any means configured to provide a frictional force directly to the motor shaft is considered to be within the scope of the present invention. Another non-limiting example would be providing a frictional surface with a plurality of features configured to provide a greater amount of frictional resistance in one direction versus another wherein the outer diameter of the motor shaft will act against the plurality of the features (e.g., a non-limiting example of the plurality of features could be a plurality of teeth configured to have an angular configuration with respect to the surface of the outer diameter of the motor shaft).

In an exemplary embodiment, one-way bearing 62 is configured to be received on and frictionally engage shaft 28 of motor 14 (e.g., an inner surface of the one-way bearing engages the outer surface of the shaft. In addition, shaft 28 further comprises a gear 68 configured to engage step gear 22 of the gear train.

In an exemplary embodiment, the assembly of the anti-second stroke/anti-seat belt payout mechanism comprising torsional spring 64 and one-way bearing 62 is snapped into a round or correspondingly configured cavity 70 defined by a housing 72, which is disposed on an inner surface of the housing cover. Housing 72 and cavity 70 will position the torsional spring outer diameter axially and radially. In addition, housing 72 will comprise a feature (e.g., slotted opening) 74 and feature configured to engage or restrain a first leg 76 of torsional spring 64 while a second end 78 is free to move within the cavity.

By restraining a single end of the torsional spring it is possible to provide a frictional engagement between the torsional spring and the one-way clutch, which is capable of being overcome when the shaft of the motor is provided with a torque in a clockwise direction, which will provide the means for eliminating the required "second stroke" phenomenon under certain conditions.

In accordance with an exemplary embodiment, the round cavity is coaxial to the motor shaft by design wherein one leg of the torsional spring is captured inside the cavity to prevent spring rotation. In accordance with an exemplary embodiment the spring is a left-hand wound spring, which corresponds to the direction of rotation of the motor shaft when it is being rotated in the clockwise direction. As illustrated, the one-way bearing inner diameter slips onto and engages the shaft of the motor when the housing cover is positioned and secured to the housing. Accordingly, the mechanism is now connected in parallel to the gear train 20 of the motorized seatbelt retractor.

In accordance with an exemplary embodiment, the one-way bearing 62 rotates freely in the counter clockwise direction, which corresponds to pre-tensioning forces applied to the seat belt webbing through the motor driving the gear train. Conversely, the one-way bearing locks up instantaneously if a rotational force is applied in the clockwise direction, which as discussed herein prevents lock up of the retractor when predetermined tensions or forces are applied to the seat belt webbing. As discussed above and herein the retractor requires a minimal amount of seat belt webbing payout to lock up when the sensors of the retractor are activated.

In an exemplary embodiment the torsional spring wraps tightly around the one-way bearing to resist the one-way bearing and thus the motor shaft from rotating in the clockwise direction, which corresponds to payout of the belt. However and in accordance with an exemplary embodiment, the frictional resistance between the inner diameter of the torsional spring and the outer diameter of the one-way clutch is regulated/configured such that the one-way bearing outer diameter can slip within the torsional spring inner diameter when either the belt payout force (e.g., scenarios wherein lockup of the retractor is desired) or the motor torque is provided in the opposite direction to release the clutch or provide haptic pulsing of the seat belt webbing.

In accordance with an exemplary embodiment and by designing the mechanism in this manner, the motor is able to drive the gear train uninterrupted during a counter clock wise rotation of the motor, which in turn rotates the web spool in the retract direction, in order to pretension the seatbelt.

However, and if a force is applied to the web in an unwinding direction due to occupant loading on the seatbelt during or after the pretensioning cycle, the load channeled into the retractor is resisted by the gear train inefficiency (e.g., back driving the larger gears of the gear train to the smaller gear attached to the motor), the one-way bearing lockup, and the torsional spring resistance. By disposing the proposed mechanism on the motor shaft (e.g., at the opposite end of the gear train from the web spool) this makes the web payout resistance more effective due to the torque amplification via the gear ratios. Thus, a predetermined amount of resistance is provided to the motorized seat belt retractor to prevent web payout under tensions or forces of a predetermined amount (e.g., forces less than those required to overcome the torsional spring resistance and the gear train inefficiencies or in other words forces that do not require retractor lockup but would lockup prior retractor devices as web payout would have been allowed).

In addition, and in accordance with an exemplary embodiment and by employing this combination of gear train inefficiency, one-way bearing lockup, and the torsional spring resistance, the requirement of a large second stroke in order to unlock the retractor mechanism is also mitigated or eliminated. For example, when an applied force is sufficient enough to overcome the gear train inefficiency and the torsional spring resistance, the retractor will lockup, as desired, however the required amount of "second stroke", will be less as the allowed payout, which requires the second stroke for unlocking has been reduced by the amounts corresponding to the payouts prevented by the now imposed gear train inefficiencies, one-way bearing lockup and the torsional spring resistance.

For example, some higher occupant loading conditions against the take up spool will cause the one-way bearing lockup to slip in the torsional spring which can result in retractor lockup at the end of the pre-tensioning cycle. However, this condition now only requires a milder second stroke to unlock the seatbelt retractor as the anti-seat belt payout mechanism will limit the amount of seat belt payout after a motorized retraction event thus, the required "second stroke" (e.g., forces applied to the seat belt via the motor in order to retract the seat belt or provide a tension slightly above the highest tension applied during motorized retraction) will be less as the seat belt payout will be limited by the anti-seat belt payout mechanism. Thus, the second stroke phenomenon is mitigated or eliminated.

In other words, and during motorized seat belt retraction the motor will retract the seat belt webbing until a certain amount of tension is applied or a predetermined amount of seat belt webbing is retracted. After motorized retraction of the seat belt webbing the anti-second stroke/anti-seat belt payout mechanism will prevent seat belt payout up until a predetermined amount of tension or force is applied to the seat belt thus preventing retractor lockup. On the other hand if the predetermined tolerance or resistance of the anti-second stroke/anti-seat belt payout mechanism is overcome and there is retractor lockup, the motorized seat belt retractor will provide a second stroke in order to provide a tension slightly higher than that provided during the motorized retraction, in order to unlock the retractor device.

In accordance with exemplary embodiments of the present invention, the required "second stroke" is minimized as the tension applied via motorized retraction will be held or maintained via the anti-seat belt payout mechanism. It is noted that there might be slight tolerances in the clutch and gear train of the system however the required "second stroke" will be much less as the anti-seat belt payout mechanism will resist seat belt payout up until a predetermined threshold is met (e.g., situations wherein payout and retractor lock up are desired). Accordingly, and when the sensed danger has passed (e.g., no collision has occurred) the motorized retractor only needs to provide a second stroke large enough to overcome the applied tension starting from a held position or tension provided by the anti-seatbelt payout mechanism, which will be much less than prior systems that allow the seatbelt to payout after motorized retraction (e.g., back driving of the motor and gear train via tensions applied to the seatbelt webbing). Thereafter and in order to unlock the clutch of the gear train, the motor will be energized to rotate in an opposite direction with a torque sufficient to overcome the frictional forces provided by the inner diameter of the torsional spring upon the outer diameter of the one-way bearing.

Additionally, the one-way bearing is set up slip within the torsional spring beyond a certain torque threshold, which is more easily provided by the shaft of the motor, as it is already located at the end of the gear train. In other words, when the direction of the motor is reversed (e.g., rotated in the clockwise direction the outer surface of the one-way bearing will slip within the inner diameter of the torsional spring as only one end of the spring is restrained and the wrap direction of the spring relative to the shaft rotation direction does not drive the spring to wrap tightly against the one-way bearing thus, the one-way bearing is allowed to rotate when a pre-determined torque is applied. This design feature of an exemplary embodiment allows: i) unlocking of the retractor should it become locked by forces higher than a predetermined level and unlocking of the gear train clutch (e.g., pawl 42), which requires the motor to rotate in the clockwise direction; and ii) providing of haptic warning signals via the seatbelt which require the motor to nudge in both counter clockwise and clock wise direction to provide a discernable seat belt vibrations and pulses.

In addition, and in accordance with exemplary embodiments this anti-second stroke/anti-seat belt payout mechanism is designed to be modular. Thus, the motorized seatbelt retractor can be used with or without this feature as no modifications are necessary to the motorized components due to its modularity aspects (e.g., placement within a cavity on the inner surface of the housing, wherein the anti-second stroke/anti-seat belt payout mechanism engages an unused shaft portion of the motor).

Figure 7:
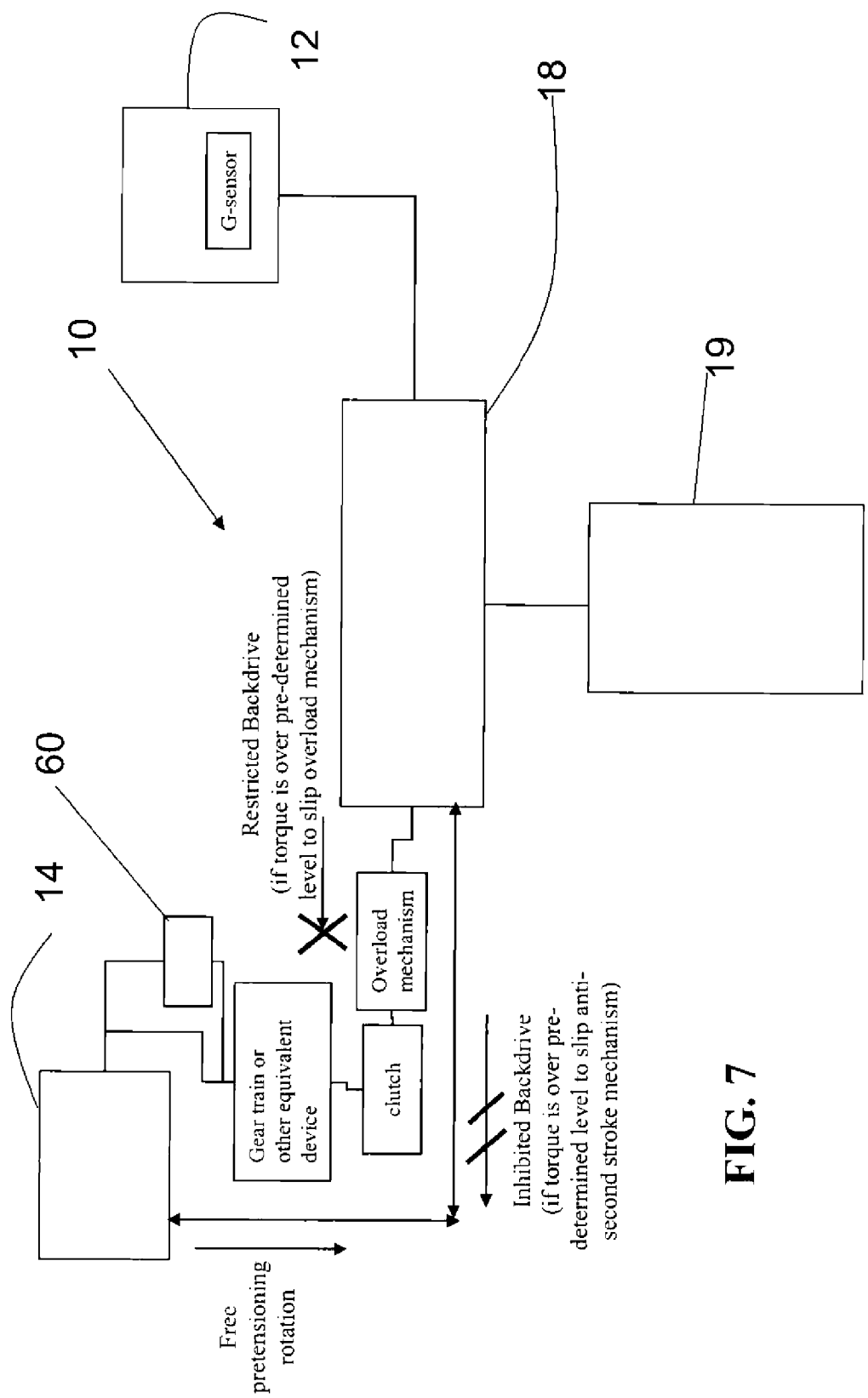
FIG. 7 is a schematic illustration of an exemplary embodiment of the present invention.

FIG. 7 provides a schematic illustration of an exemplary embodiment of the present invention. As illustrated, the motorized seatbelt retractor 10 comprises motor 14 that is configured to provide rotational forces to take-up spool 18, which is configured to wind up a portion of a seat belt webbing 19. In addition, and as discussed herein ALR/ELR or locking retractor 12 retractor is configured to prevent further pay out of the seat belt webbing when there is an abrupt pulling (tension) on the belt sensed by a web sensor or there is activation of a G sensor, which in combination of G sensor activation and web payout will cause lockup of the seat belt retractor. In accordance with an exemplary embodiment of the present invention an anti-second stroke/anti-seat belt payout mechanism 60 prevents seatbelt payout (under certain conditions e.g., seatbelt webbing forces or tensions below a predetermined value) during and/or after a motorized retraction of the seatbelt webbing thus, preventing retractor lockup unless the predetermined forces have been exceeded. Accordingly, exemplary embodiment of the present invention prevent retractor lockup during and/or motorized retraction unless certain seatbelt tensions are exceeded.

Figure 8:
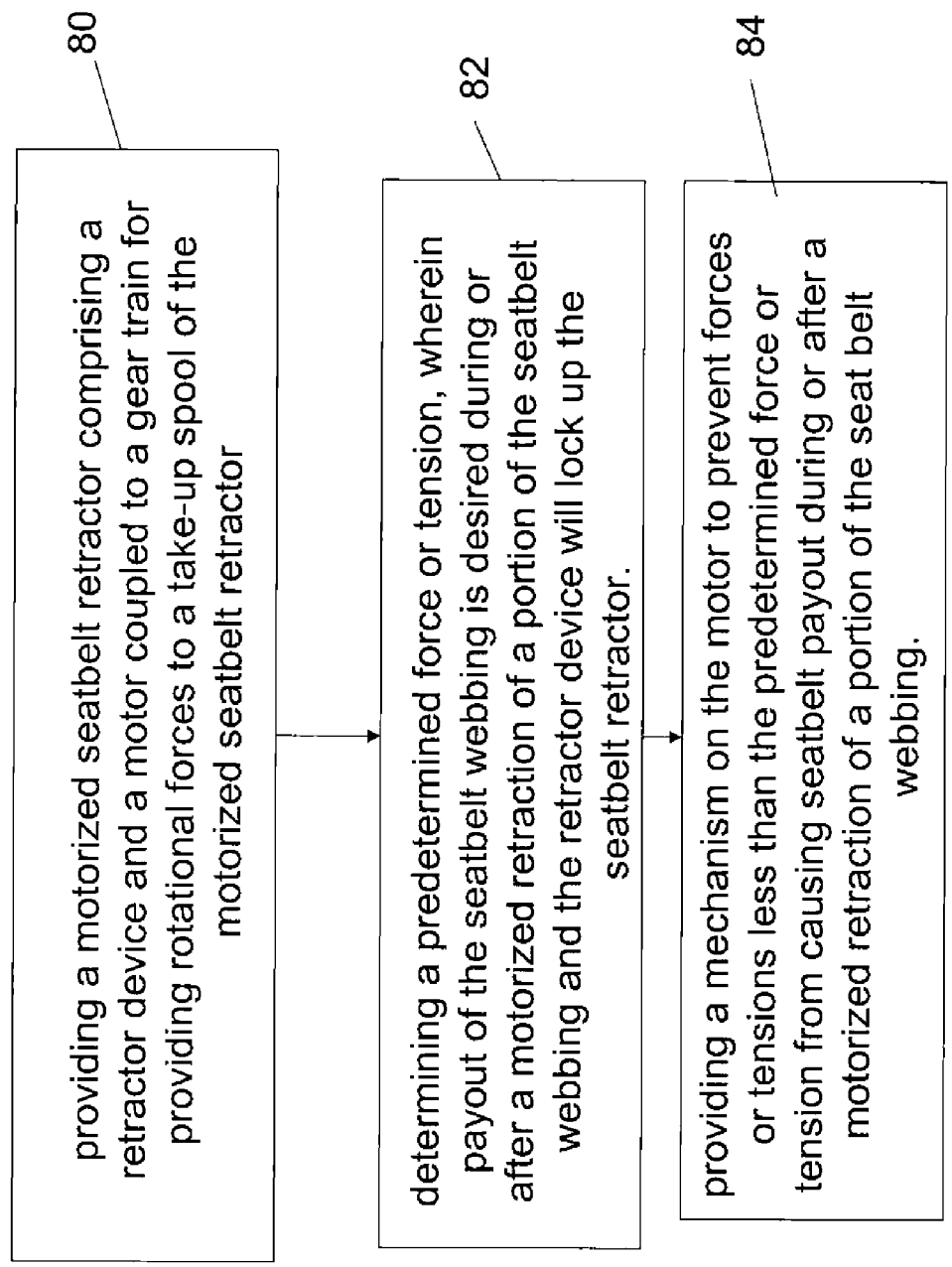
FIG. 8 is a block diagram illustrating a method in accordance with an exemplary embodiment of the present invention.

Referring now to FIG. 8, non-limiting steps of a method for preventing/mitigating the need for a "second stroke" in order to unlock a motorized seat belt retractor is provided. A step 80 is identified as providing a motorized seatbelt retractor comprising an ALR/ELR device and a motor coupled to a gear train for providing rotational forces to a take-up spool of the motorized seatbelt retractor. A step 82 is identified as determining a predetermined force or tension, wherein payout of the seatbelt webbing is desired during or after a motorized retraction of a portion of the seatbelt webbing, wherein the payout of the seatbelt webbing under the predetermined force or tension will result in the lockup of the seatbelt retractor via the ALR/ELR device. A step 84 is identified as providing a mechanism on the motor to prevent forces less than the predetermined force from causing seatbelt payout during or after a motorized retraction of a portion of the seatbelt webbing.

Figure 9C:
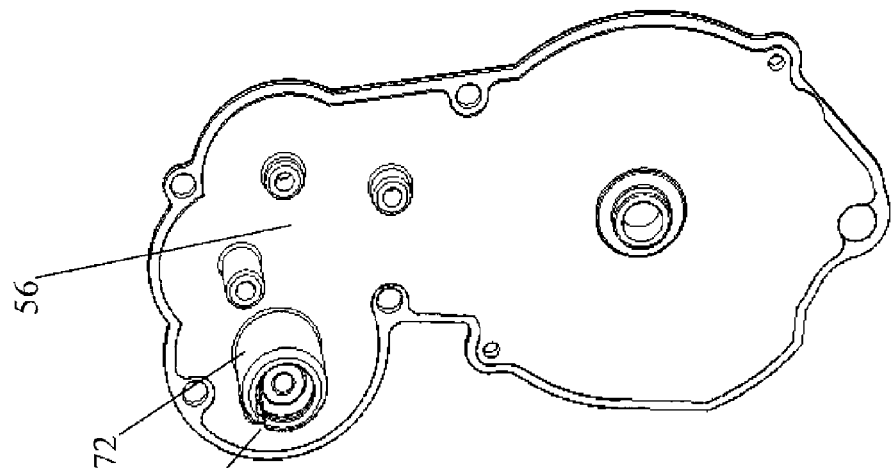
FIGS. 9A-9C are views of a housing portion constructed in accordance with exemplary embodiments of the present invention.
Figure 9B:
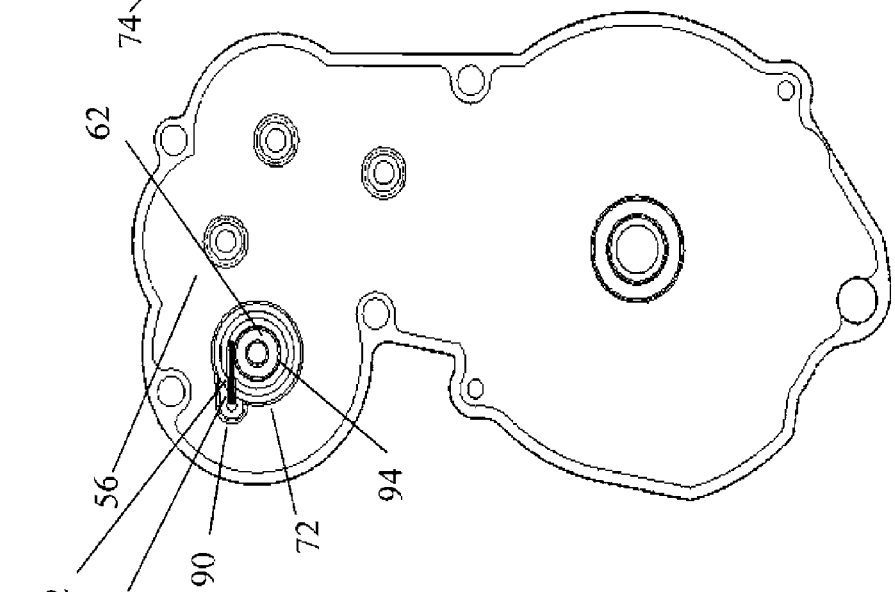
Figure 9A:
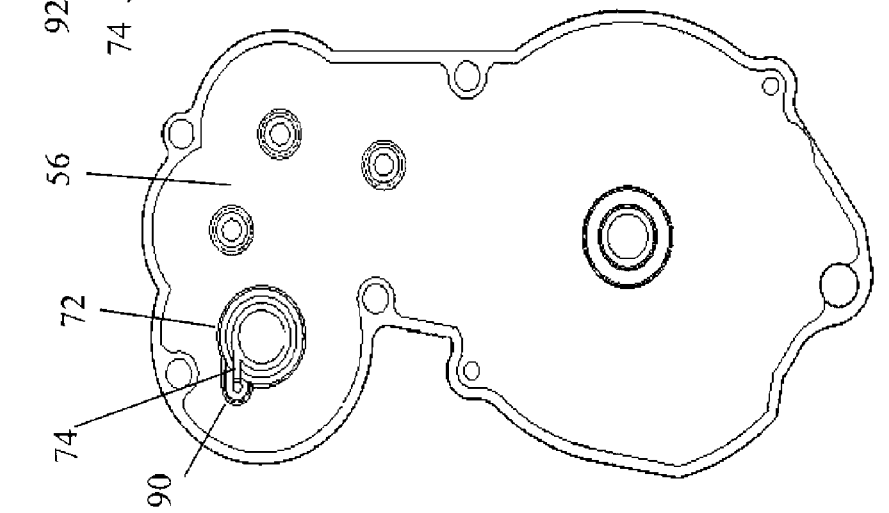

Referring now to FIGS. 9A-9C, housing cover 56 is illustrated. In accordance with an exemplary embodiment housing cover 56 comprises a housing 72 configured to receive the one-way bearing 62 and the torsional spring therein. In accordance with an exemplary embodiment, the slotted opening allows an end 76 to pass therethrough and engage a feature 90 positioned proximate to the housing.

In accordance with an alternative exemplary embodiment the torsional spring is replaced with a cantilevered spring member 92, which is configured to be received within the slotted opening and provide frictional resistance to an exterior surface 94 of the one-way bearing.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A motorized seat belt retractor, comprising:
    a take-up spool configured to rotate in a winding direction and an unwinding direction;
    a motor for providing a driving force in a first direction and a second direction to the take-up spool, wherein the take-up spool rotates in the winding direction when the driving force is provided in the first direction;
    a mechanism coupled to a shaft of the motor, the mechanism being configured to rotate freely in the first direction and rotate in the second direction when either i) a predetermined force is applied to the take-up spool in the unwinding direction during or after application of the driving force in the first direction or ii) the motor applies the driving force in the second direction in order to overcome a predetermined resistance of the mechanism, wherein the mechanism comprises a one-way bearing that is disposed about the shaft of the motor and a spring disposed about the one-way bearing, the one-way bearing being configured to freely rotate in first direction, and the spring provides a frictional resistance to an outer diameter of the one-way bearing; and
    a locking retractor configured to prevent the take-up spool from rotating in the unwinding direction when the predetermined force is applied to the take-up spool in the unwinding direction during or after application of the driving force in the first direction.

2. The motorized seat belt retractor as in claim 1, further comprising: a housing defining a cavity wherein a portion of the shaft of the motor is disposed in an area defined by the housing and the mechanism is located and disposed on an inner surface of a housing cover configured to cover the cavity.

3. The motorized seat belt retractor as in claim 2, wherein the housing cover further comprises a receiving area defined by a peripheral wall and the spring is a torsional spring having an inner diameter configured to provide the frictional resistance to the outer diameter of the one-way bearing, wherein the torsional spring is disposed within the receiving area.

4. The motorized seat belt retractor as in claim 3, wherein the peripheral wall positions an outer diameter of the torsional spring axially and radially and one end of the torsional spring is engaged in a slotted opening of the peripheral wall while another end of the torsional spring is free to rotate within the receiving area.

5. The motorized seat belt retractor as in claim 4, wherein the one end of the torsional spring is secured to the slotted opening by an interference fit.

6. The motorized seat belt retractor as in claim 1, wherein the spring is a cantilevered arm disposed in the receiving area, the cantilevered arm being configured to provide the frictional resistance to the outer diameter of the one-way bearing.

7. The motorized seat belt retractor as in claim 1, wherein the shaft of the motor is coupled to the take-up spool by a gear train having a plurality of gears, wherein the gear train is capable of being driven by a first torque applied by the shaft of the motor to a first gear of the plurality of gears, the first gear being directly coupled to the shaft of the motor and wherein the first torque is less than a second torque required to drive the gear train by rotating another gear of the plurality of gears and the mechanism is disposed about the shaft of the motor.

8. The motorized seat belt retractor as in claim 1, further comprising a clutch mechanism for coupling the motor to the take up spool when the motor provides the driving force in the first direction, wherein the clutch mechanism further comprises a locking pawl which becomes engaged when the motor provides the driving force in the first direction.

9. The motorized seat belt retractor as in claim 1, wherein the locking retractor requires an initial rotation of the spool in the unwinding direction in order to cause the locking retractor to activate and prevent further rotation in the unwinding direction.

* * * * *